United States Patent

[11] 3,632,872

[72] Inventor Donald W. Ridley
Stamford, Conn.
[21] Appl. No. 839,562
[22] Filed July 7, 1969
[45] Patented Jan. 4, 1972
[73] Assignee Columbia Broadcasting System, Inc.
New York, N.Y.

[54] VERTICAL SYNCHRONIZATION PULSE SEPARATOR
10 Claims, 1 Drawing Fig.

[52] U.S. Cl. .......... 178/7.3 S, 178/7.5 S, 328/139
[51] Int. Cl. .......... H04n 5/08
[50] Field of Search .......... 178/7.3 S, 7.5 S, 69.5 TV, 69.5 F; 307/232; 328/110, 139, 187; 325/474, 475, 476

[56] References Cited
UNITED STATES PATENTS
3,182,122 5/1965 Kao .......... 178/7.3 S

*Primary Examiner*—Robert L. Griffin
*Assistant Examiner*—George G. Stellar
*Attorney*—Brumbaugh, Graves, Donohue & Raymond

ABSTRACT: A synchronization pulse separator in an electronic system utilizes a clamp to remove synchronization pulses from a composite video signal. The signal, with the synchronization pulses removed, is then subtracted from a composite signal from which the pulses have not been removed. The subtraction is performed by a differential amplifier having a uniform pulsed output corresponding to the synchronization pulses.

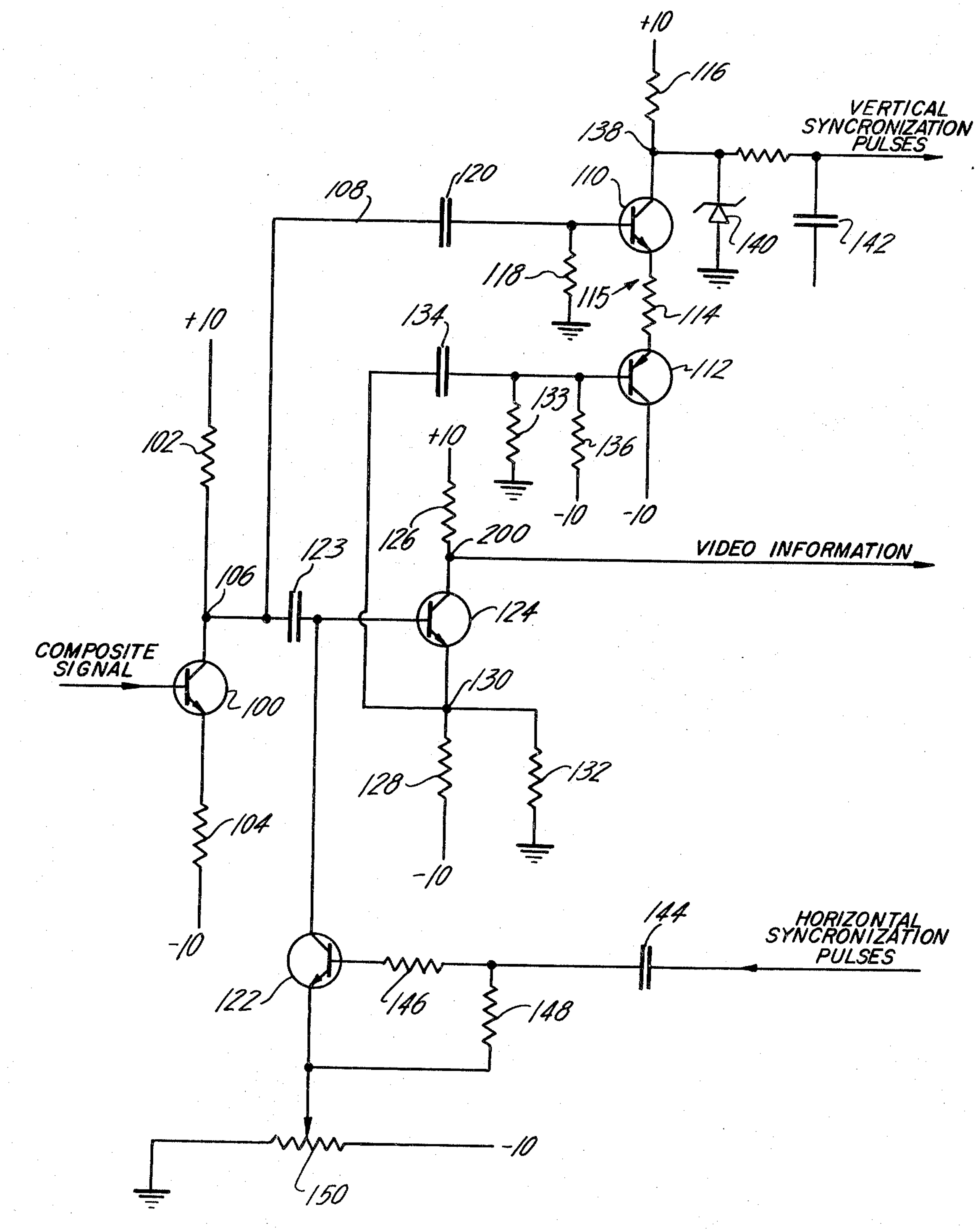
INVENTOR
DONALD W. RIDLEY
BY
Brumbaugh, Graves, Donohue + Raymond
his ATTORNEYS

VERTICAL SYNCHRONIZATION PULSE SEPARATOR

BACKGROUND OF THE INVENTION

This invention relates to electronic apparatus for separating synchronization pulses from the remainder of a composite video signal, and more particularly to a novel and highly effective apparatus for separating vertical synchronization pulses which do not have amplitude superiority.

A composite video signal includes both synchronization pulses and video information. The video information, as that term is used here, relates to the brightness of each element of detail contained in the image. The synchronizing pulses synchronize the scanning of the screen with the signal. In this way each portion of the video information is used to control the proper area of the screen and the signal can be translated, i.e., the desired image can be reproduced.

One function of an electronic video system which receives a broadcast signal or plays a tape or a photographic film on which a video signal is recorded is to separate the synchronization pulses which are part of the composite signal. In many instances the composite signal includes both vertical and horizontal synchronization pulses. In a system of the type which plays a photographic film, however, only the vertical synchronization pulses are conventionally included in the composite signal. In this instance, the horizontal synchronization pulses are generated by the reproducing apparatus itself. These horizontal synchronization pulses are used to control both the scanning of the film to generate the composite signal and the scanning of the screen to reproduce the image. In systems of all types, however, any synchronization pulses which do form part of the composite signal must be separated. In the past, this has been accomplished by generating synchronization pulses having an amplitude greater than the maximum amplitude of the video information. The composite signal is clipped to separate these pulses. Noise pulses having greater amplitude than the synchronization pulses are discriminated against by limiting or gating.

Electronic devices which play a photographic film on which a video signal has been recorded conventionally generate the vertical synchronization pulses, which form part of the composite signal, by placing a light behind the film. To provide synchronization pulses with the amplitude superiority required by known synchronization pulse separating techniques, it is necessary to use a light which, because of its brightness, generates undersired noise in the composite signal. It is difficult to eliminate this noise because the film used commonly has light transmissivity in the black areas of approximately 10 percent.

It is, of course, possible to reduce the brightness of the light placed behind the film, and to correspondingly reduce the amplitude range available for the remainder of the composite signal. This, however, leads to a reduction of the quality of the image produced.

SUMMARY OF THE INVENTION

It is an object of the invention to provide a new and improved apparatus which is capable of separating synchronization pulses which do not have amplitude superiority, thereby reducing the total amplitude range required by the composite signal without reducing the amplitude range available to the video information.

The present invention incorporates a novel and improved circuit for separating synchronization pulses that does not depend upon amplitude superiority. Accordingly, the amplitude range available to the portion of the signal representing video information is maximized in relation to the total amplitude range utilized by the composite signal.

In the device of this invention the composite signal is passed through a first means, which may be a clamp, for removing the synchronization pulses from the signal. A second means responsive to said first means, which may comprise a differential amplifier, is provided for subtracting the signal, with the synchronization pulses removed, from the composite signal, the output of said second means being separated synchronization pulses.

In the embodiment described in detail below the means for removing the vertical synchronization pulses comprises a clamp which is responsive to horizontal synchronization pulses.

BRIEF DESCRIPTION OF THE DRAWING

An understanding of additional aspects of the invention can be gained from a consideration of the following detailed description of a representative embodiment of the invention, in conjunction with the appended drawing, wherein the sole FIGURE is a schematic view of a representative circuit constructed in accordance with the invention.

DESCRIPTION OF THE PREFERRED EMBODIMENT

The drawing shows a representative embodiment of a circuit constructed in accordance with the invention and designed for an available potential of 20 volts (plus and minus 10 volts from ground). The composite signal, which is assumed to be negative, serves as an input to the base of a transistor 100. A resistor 102 is connected between the collector of transistor 100 and the positive lead of the 20-volt potential. A resistor 104 is connected between the emitter of transistor 100 and the negative lead of the 20-volt potential. Thus, resistors 102 and 104 establish the range of the collector-emitter current of transistor 100. A composite signal is drawn from a junction 106 between the transistor 100 and the resistor 102. Assuming that the input signal is negative, the parameters of transistor 100 are selected so that the positive white signals drawn from junction 106 vary up to +1 volt. It is noted again that the amplitude of the vertical synchronization pulses does not exceed the amplitude of the portion of the signal representing the video information.

The unclamped composite signal drawn from the junction 106 is applied, via a line 108, to the base of a first transistor 110. The emitter of the first transistor 110 and the emitter of a second transistor 112 are connected across a resistor 114 to form a differential amplifier 115 which receives, as a first input, the composite signal, including the synchronization pulses from the video amplifier. An appropriate dropping resistor 116 is provided between the +10-volt lead and the collector of transistor 110. The transistors 100 and 110 are RC coupled through a resistor 118 and a capacitor 120.

To provide a second input to the differential amplifier 115, another portion of the positive white signal drawn from the junction 106 is clamped by the operation of a first means for removing the synchronization pulses from the composite signal. The first means comprises a circuit means susceptible of forward bias and reverse bias and is arranged so that the portion of the composite signal produced when the circuit means is forward biased is not transmitted to the differential amplifier 115. In this embodiment the circuit means is shown as a transistor 122.

The signal clamped by the action of the transistor 122, which is also passed through a decoupling capacitor 123, is applied to the base of a transistor 124. The collector of transistor 124 is connected through a resistor 126 to the +10-volt lead. The emitter of transistor 124 is connected through resistor 128 to the negative lead. The resistors 126 and 128 are selected to provide an appropriate potential level for the positive white signal which is drawn at a junction 130 between the emitter of transistor 124 and resistor 128. This signal is grounded through a resistor 132.

As described above, the second input to the differential amplifier 115 is clamped by the action of the transistor 122. Accordingly, the transistor 122 is forward biased by the horizontal synchronization pulses which are applied to its base. The presence of a horizontal synchronization pulse forward biases the transistor 122 causing it to become conductive across its collector-emitter junction. Thus, when a synchronization pulse is present, the transistor 122 provides an alternative path for the signal drawn from junction 106 and this portion of the composite signal supplied to the base of the transistor 100 is not included in the clamped input to the differential amplifier 115. The missing component of that signal is the vertical synchronization pulse. This vertical synchronization pulse is present in the composite signal supplied to the transistor 100 only when a horizontal synchronization pulse has forward-biased transistor 122.

The clamped signal drawn from the junction 130 is a positive white signal. The junction 130 is RC coupled through a resistor 133 and a capacitor 134, to the base of transistor 112, which is connected to the −10-volt supply through a resistor 136. Thus, the clamped signal forms the second input received by the differential amplifier 115. It is subtracted from the unclamped positive white signal drawn from junction 106 which forms the first input. Thus, the differential amplifier 115 generates a pulsed output corresponding to the vertical synchronization pulses. This output is drawn off at junction 138 and is clipped and filtered by a third means for maintaining the amplitude of the pulses of the pulsed output uniform. The third means comprises a zener diode 140 and a low-pass filter 142. The output of the third means is a clean separated vertical synchronization pulse even though the amplitude of this pulse was of smaller amplitude than the maximum amplitude of the video information portion of the composite signal.

The transistor 124 and the clamp, including the transistor 122, the capacitor 144, and the resistors 146 and 148, which are connected to the base of the transistor 122 to decouple the source of the horizontal synchronization pulses and to bias the transistor 124, are not extra components required by this invention but are required by a conventional video amplifier. Hence the invention can economically be incorporated in an appropriate device.

A variable resistor 150, which is connected to the emitter of the transistor 122 and to the −10-volt lead, is set in accordance with the desired quiescent point of the transistor 122.

The above-described embodiment of the invention is intended to be merely exemplary, and those skilled in the art will be able to make numerous variations and modifications of it without departing from the scope and spirit of the invention. For instance, a video information signal component of maximum amplitude could be made to correspond to black rather than white. Similarly, the polarity of the signal could be reversed at various points within the circuit. It is also apparent that the principles of the inventive concept could be applied to live broadcasts and magnetic recordings as well as to photographic recordings. Although the embodiment described above uses horizontal synchronization pulses to operate a vertical synchronization pulses separator, it is possible to apply the concept of the invention to the separation of synchronization pulses generally.

I claim:

1. In an electronic video system capable of translating a composite signal containing synchronization pulses and other video information, a synchronization pulse separator comprising first means for periodically removing a portion of the composite signal, the removed portions containing the synchronization pulses and the remaining portions containing other video information, and second means for subtracting said remaining portions of the signal from which the synchronization pulses have been removed by the first means from the composite signal containing synchronization pulses, the output of the second means being separated synchronization pulses.

2. The system of claim 1 in which said first means comprises circuit means susceptible of forward bias and susceptible of reverse bias and arranged so that the portion of the composite signal received when said circuit means is forward biased is not transmitted to said second means.

3. The system of claim 2 in which the composite signal includes vertical synchronization pulses and in which said circuit means is further arranged so as to be forward biased by horizontal synchronization pulses, the output of said second means being separated vertical synchronization pulses.

4. The system of claim 1 wherein the first means is responsive to a periodic input the frequency of which is at least equal to the frequency of the synchronization pulse and which is present whenever a synchronization pulse is present.

5. The system of claim 1 wherein the first means is responsive to horizontal synchronization pulses and removes those portions of the composite signal that occurs at the same time as the horizontal synchronization pulses.

6. In an electronic video system capable of receiving and translating a composite video signal containing synchronization pulses, a synchronization pulse separator comprising first means for periodically removing a portion of the composite signal, the removed portion containing the synchronization pulses and the remaining portions containing other video information, and second means for generating a pulsed output corresponding to the synchronization pulses, said second means being arranged to receive first and second inputs and to subtract the second from the first, the first input being the composite signal-containing synchronization pulses and the second input being a signal containing other video information from which the synchronization pulses have been removed by the first means, the output of the second means being a series of separated vertical synchronization pulses.

7. The system of claim 6 in which said separator further comprises third means for maintaining the amplitude of the pulses of said pulsed output uniform, said third means comprising a zener diode and a low-pass filter.

8. The system of claim 6 in which said differential amplifier of said second means comprises first and second transistors arranged so that the base of said first transistor is connected to receive said first input and the base of said second transistor is connected to receive said second input.

9. The system of claim 8 in which the emitters of said first and second transistors are connected to each other.

10. An electronic video system capable of translating a composite signal containing vertical synchronization pulses and other video information, said system including a video amplifier and a vertical synchronization pulse separator, the separator comprising a clamping means responsive to horizontal synchronization pulses for removing vertical synchronization pulses from a composite signal received from the video amplifier, and a differential amplifier means for generating a pulsed output corresponding to the vertical synchronization pulses, the differential amplifier means being responsive to two inputs one of which is a signal from which the vertical synchronization pulses have been removed by the clamping means and the other of which is a complete composite signal received from the video amplifier.

* * * * *